United States Patent [19]

Wissbrun et al.

[11] Patent Number: 5,264,477

[45] Date of Patent: Nov. 23, 1993

[54] LIQUID CRYSTALLINE POLYESTERS CONTAINING METAL TEREPHTHALATE NUCLEATING AGENTS

[75] Inventors: Kurt F. Wissbrun, Short Hills; James P. Shepherd, Springfield, both of N.J.

[73] Assignee: Hoechst Celanese Corp., Somerville, N.J.

[21] Appl. No.: 922,704

[22] Filed: Jul. 28, 1992

[51] Int. Cl.$^5$ .................. C08K 5/04; C08G 63/02; C08G 63/78
[52] U.S. Cl. .................. 524/396; 528/272; 528/275; 528/277; 528/279; 528/280; 528/281; 528/282; 528/283; 528/285
[58] Field of Search .......... 524/396; 528/272, 275, 528/277, 279, 280, 281, 282, 283, 285

[56] References Cited

U.S. PATENT DOCUMENTS

| | | | |
|---|---|---|---|
| 4,891,397 | 1/1990 | Liu | 528/272 |
| 4,908,428 | 3/1990 | Bastioli et al. | 524/141 |

*Primary Examiner*—John Kight, III
*Assistant Examiner*—T. Mosley
*Attorney, Agent, or Firm*—James L. McGinnis

[57] ABSTRACT

In situ formation of a melt processable liquid crystalline polyester composition capable of forming an anisotropic melt phase at a temperature of below approximately 400° C. having an improved heat distortion temperature under a load, the composition being formed in the presence of from approximately 0.05 to approximately 1.0 weight percent of a divalent metal salt of terephthalic acid as a nucleating agent. Films, fibers and molded articles produced from the composition exhibit improved thermal properties.

21 Claims, No Drawings

LIQUID CRYSTALLINE POLYESTERS CONTAINING METAL TEREPHTHALATE NUCLEATING AGENTS

FIELD OF THE INVENTION

The present invention relates to the in situ formation of liquid crystalline polyester compositions containing metal salts of terephthalic acid as nucleating agents. The compositions exhibit enhanced thermal properties and are useful in the preparation of films, fibers and molded articles.

BACKGROUND OF THE INVENTION

When utilized as nucleating agents, divalent metal terephthalate salts are extremely stable up to a temperature of approximately 400° C., insoluble in most solvents, and have very low electrical conductivity. It is s believed that the incorporation of a nucleating agent into a polymer melt might enhance the mechanical properties of the polymer. However, known techniques for the addition of nucleating agents to liquid crystal polymers typically result in nonuniform polymer properties and reduces melt processability.

It is desirable to improve the crystal forming properties of liquid crystal polyesters without significantly reducing the mechanical properties. One essential property influenced by crystal formation is the distortion temperature under a load, i.e., heat distortion temperature. The heat distortion temperature under a load is the temperature above which a polyester can no longer support a useful force with time. A film, fiber or molded article having an improved heat distortion temperature under a load would be more suitable for high heat applications.

SUMMARY OF THE INVENTION

The present invention is directed to an improved melt processable liquid crystalline polyester composition capable of forming an anisotropic melt phase at a temperature below approximately 400° C., the improvement comprising the in situ formation of the composition in the presence of from approximately 0.05 to approximately 1.0 weight percent, based on the total weight of the composition, of at least one nucleation agent of the formula:

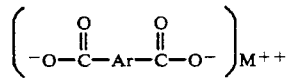

wherein M is a divalent metal selected from the group consisting of zinc, calcium, cadmium, barium and mixtures thereof, wherein Ar is selected from

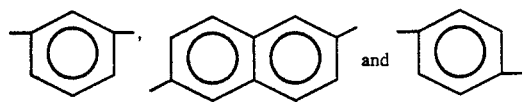

and wherein upon melt processing, the nucleating agent is absorbed into the matrix of the composition to enhance the crystallization and distoration temperature under a load of the composition. Films, fibers and molded articles produced from the polyester composition exhibit enhanced thermal and mechanical properties.

DETAILED DESCRIPTION OF THE INVENTION

The general theory of incorporation of divalent metal salts of terephthalic acid into liquid crystalline polyesters is to advantageously influence crystal formation of the polymer melt. The polymerization reaction of the individual monomers of a liquid crystalline polyester occurs at a temperature of below approximately 365° C. Divalent metal terephthalates, in general, decompose at a temperature approximately 375° C. It is believed that divalent metal terephthalates included in the reaction mixture, i.e., in situ formation, of a liquid crystalline polyester composition do not participate in the polymerization of the monomers, but are distributed in such a way that upon melting processing the composition, the metal terephthalates are dissolved in matrix to influence crystallization upon cooling the melted composition.

The addition of a small amount of a divalent metal salt of terephthalic acid, as a nucleating agent, to the reaction mixture of a liquid crystalline polyester will improve the distortion temperature under a load (DTUL) of the polyester while not adversely affecting other desirable properties. The addition of a nucleating agent selected from the formula:

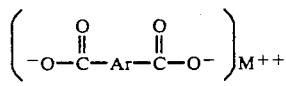

wherein M is a divalent metal selected from the group consisting of zinc, calcium, cadmium, barium and mixtures thereof, and wherein Ar is selected from

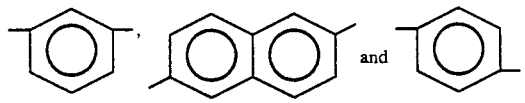

to the reaction mixture of an anisotropic polyester will will improve the crystallinity and DTUL of the resulting polyester composition. Although many divalent metals are contemplated by the present invention, typically, zinc, calcium, cadmium and barium are utilized. The preferred divalent metal is zinc which is added to the liquid crystalline polyester reaction mixture as zinc terephthalate. Generally, the addition of approximately 0.05 to approximately 1.0 weight percent of the nucleating agent to the reaction mixture of the liquid crystal polyester, based on the total weight of the mixture, and subsequent reaction thereof by way of conventional polymerization techniques will improve the DTUL without significantly diminishing the melt processability of the resulting polyester composition. Typically, the addition of approximately 0.25 to approximately 0.75 weight percent, and preferably the addition of approximately 0.50 weight percent of the nucleating agent to the reaction mixture of a liquid crystal polyester, based on the total weight of the mixture, will improve the crystallinity and DTUL of the polyester composition.

Generally, the liquid crystalline polyesters useful in the instant invention are those containing at least one moiety derived from monomers selected from p-hydroxybenzoic acid, 6-hydroxy-2-naphthoic acid and terephthalic acid. The nucleating agent is believed to be most effective in producing superior results when at least one moiety of terephthaloyl is incorporated into the backbone of the polyester. Optionally, a monomer derived from p,p'-biphenol may also be included in the backbone of the polyester, e.g., 4,4'-diacetoxybiphenyl.

Typically, the liquid crystalline polyesters of the invention are selected from wholly aromatic polyesters, aliphatic-aromatic polyesters, poly(ester-amides) and poly(ester-carbonates). Some preferred liquid crystalline polyesters useful in the invention are disclosed in U.S. Pat. Nos. 3,637,595; 4,116,943; 4,219,416; 4,351,918; 4,473,682; 5,013,819; and 5,015,722 the subject matter of which are herein incorporated in their entirety by reference thereto.

One embodiment of the invention is directed to a method of improving the distortion temperature under a load of a wholly aromatic liquid crystalline polyester composition capable of forming an anisotropic melt phase at a temperature below approximately 400° C. having enhanced heat distortion temperature containing recurring moieties of (a) from approximately 3 to approximately 10 mole percent of 6-oxy-2-naphthoyl, (b) from approximately 20 to approximately 70 mole percent of 4-oxybenzoyl, (c) from approximately 7.5 to approximately 38.5 mole percent of 4,4'-dioxybiphenyl, and (d) from approximately 7.5 to approximately 38.5 mole percent of terephthaloyl; by the steps of forming the composition in the presence of from approximately 0.05 to approximately 1.0 weight percent, based on the total weight of the polyester, of at least one nucleating agent of the formula:

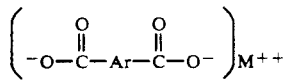

wherein M is a divalent metal selected form the group consisting of zinc, calcium, cadmium, barium and mixtures thereof, wherein Ar is selected from

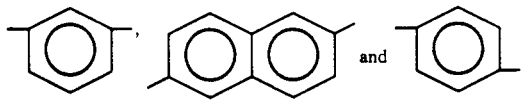

and wherein upon melt processing of the composition, the nucleating agent is absorbed into the matrix of the composition to enhance the crystallization of the composition. A preferred embodiment of the invention is directed to a method of improving the distortion temperature under a load of a wholly aromatic liquid crystalline polyester composition capable of forming an anisotropic melt phase at a temperature below approximately 375° C. having enhanced heat distortion temperature under a load containing recurring moieties of (a) from approximately 3.5 to approximately 4.0 mole percent of 6-oxy-2-naphthoyl, (b) approximately 60 mole percent of 4-oxybenzoyl, (c) from approximately 18.0 to approximately 18.25 mole percent of 4,4 -dioxybiphenyl, and (d) from approximately 18.0 to approximately 18.25 mole percent of terephthaloyl; by the steps of forming the composition in the presence of from approximately 0.05 to approximately 1.0 weight percent, based on the total weight of the composition, of at least one nucleating agent referred to hereinabove, wherein upon melt processing the composition, the nucleating agent is absorbed into the matrix of the composition to enhance the crystallization of the composition.

Another embodiment of the invention is a method of improving the distortion temperature under a load of a wholly aromatic liquid crystalline polyester composition capable of forming an anisotropic melt phase at a temperature of below approximately 400° C. containing recurring moieties of (a) from approximately 10 to approximately 90 mole percent of 4-oxybenzoyl, and (b) from approximately 10 to approximately 90 mole percent of 6-oxy-2-naphthoyl; by the steps of forming the composition in the presence of from approximately 0.05 to approximately 1.0 weight percent, based on the total weight of the polyester, of at least one nucleating agent of the formula:

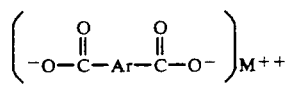

wherein M is a divalent metal selected form the group consisting of zinc, calcium, cadmium, barium and mixtures thereof, wherein Ar is selected from

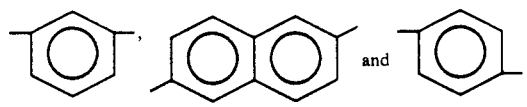

and wherein upon melt processing the composition, the nucleating agent is absorbed into the matrix of the composition to enhance the crystallization of the composition. A preference of this embodiment is a method of improving the distortion temperature under a load of a wholly aromatic liquid crystalline polyester capable of forming an anisotropic melt phase at a temperature of below approximately 400° C. containing recurring moieties of (a) from approximately 73 to approximately 80 mole percent of 4-oxybenzoyl, and (b) from approximately 20 to approximately 27 mole percent of 6-oxy-2-naphthoyl; by the steps of forming the composition in the presence of from approximately 0.05 to approximately 1.0 weight percent, based on the total weight of the composition, of the nucleating agent described hereinbefore, wherein upon melt processing the composition, the nucleating agent is absorbed into the matrix of the composition to enhance the crystallization of the composition.

Still another embodiment of the invention is directed to a method of improving the heat distortion under a load of a liquid crystalline polyester composition, the improvement comprising forming of the composition in situ in the presence of from approximately 0.05 to approximately 1.0 weight percent of a nucleating agent of the formula:

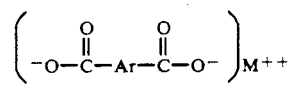

wherein M is selected from the group consisting of zinc, calcium, cadmium, barium and mixtures thereof, and wherein Ar is selected from the group consisting of

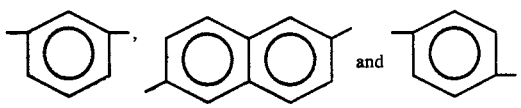
and

An increase in DTUL of as high as approximately 8° C. can be exhibited by the incorporation of approximately 0.5 weight percent of zinc terephthalate into a liquid crystalline polyester. The increase in DTUL is advantageous when articles of manufacture, e.g., films, fibers and molded articles produced from the polyester are subjected to high temperature environment. The increase in DTUL will prevent the article from deforming under higher temperature conditions.

Good melt processability, low melting temperature and high DTUL of the polyesters of the present invention make them useful in the production of films, fibers and molded articles that will be subjected to high temperature environments. Electronic circuit boards produced from the liquid crystalline polyesters of the present invention are able to sufficiently withstand deformation and decomposition when exposed high temperature soldering processes. One high temperature soldering process is infrared soldering. Infrared soldering involves the use of light in the infrared spectrum to melt solder connections of electronic components mounted on the circuit board. Tensile and flex modulus of molded articles are also improved by the addition of the nucleating agent of the invention to liquid crystalline polyesters.

The general procedure for preparation of a liquid crystalline polyester composition in the presence of a metal terephthalate nucleating agent requires placing the desired monomers into a two (2) liter 3-necked flask ("slim Jim") equipped with a Vigreaux column and condenser, nitrogen inlet, thermocouple and stainless steel "C"-stirrer, along with the metal terephthalate compound and an esterification catalyst (e.g., sodium and potassium acetates). The system is deaerated with three vacuum nitrogen purge cycles before the addition of acetic anhydride (2.5% molar excess). The flask is then placed in a fluidized sand bath and heated according to a preprogrammed time-temperature cycle while purging the contents of the flask with nitrogen. The temperature profile is designed to allow adequate time for acetylation of the monomers which is followed by oligomerization, and finally polymerization. During the later stage of the profile the system is slowly evacuated (in 100 mbar increments). When the change in torque reaches a predetermined level the vacuum is released by purging nitrogen into the system. The system is disassembled and the polymer is allowed to cool. The polymer plug is removed by breaking the flask, cut into pieces and ground into small particles for analysis.

The following examples are general illustrations of preparing the polyester compositions in accordance with the present invention; additional polyesters containing the nucleating agents can be prepared using similar procedures.

EXAMPLE 1

This example illustrates the preparation of an anisotropic wholly aromatic polyester composition containing zinc terephthalate, as a nucleating agent, and recurring moieties of 4-oxybenzoyl, 6-oxy-2-naphthoyl, terephthaloyl and moieties derived from 4,4'-dioxybiphenyl in the mole ratio 60.0:3.5:18.25:18.25 respectively, and 0.5 weight percent of zinc terephthalate (ZnTA).

To a 2 liter 3-necked ("slim Jim") flask equipped with a C-shaped 316 stainless steel, nitrogen inlet tube, thermocouple, a Vigreux column attached to a condenser and receiver were charged the following reactants:
(a) 485.1 grams of 4-hydroxybenzoic acid (3.6 moles);
(b) 38.6 grams of 6-hydroxy-2-naphthoic acid (0.21 moles);
(c) 175.5 grams of terephthalic acid (1.095 moles);
(d) 198.9 grams of 4,4 -diacetoxybiphenyl (1.095 moles);
(e) 0.80 grams of zinc terephthalate (0.006 moles or 0.1 mole percent); and
12 gm. of a 1.2 (w/v) solution of potassium acetate in acetic acid (60 ppm K+) was added as a catalyst along with 621.8 grams of acetic anhydride (2.5 mole % excess).

The flask was immersed in a sand bath provided with means to accurately control the temperature, thoroughly purged of oxygen by evacuating and flushing with nitrogen three times before the addition of acetic anhydride, and slowly heated in a fluidized sand bath while purging with nitrogen according to the following temperature versus time profile through the use of a MicRIcon ® controller:

| Sequence | Temp, °C. | Time, min | Torque @ 75 rpm |
| --- | --- | --- | --- |
| 1 | 25 | 1 | — |
| 2 | 125 | 50 | 43.1 |
| 3 | 140 | 40 | 38.6 |
| 4 | 150 | 20 | — |
| 5 | 200 | 45 | 34.2 |
| 6 | 210 | 5 | — |
| 7 | 220 | 6 | — |
| 8 | 275 | 50 | — |
| 9 | 310 | 70 | — |
| 10 | 335 | 25 | 32.8 |
| 11 | 350 | 15 | — |
| 12 | 355 | 15 | — |
| 13 | 355 | 60 | 89.0 |
| 14 | 10 | 30 | — |
| 15 | 10 | 1 | — |

Acetic acid began to distall over and was collected in a graduated cylinder. The contents of the flask were heated while stirring at a rate of 75 rpm (torque=13 mV) to 182.6° C. over a period of 135 minutes at which time 260 mls. of acetic acid had been collected and the torque was 34.2 mV. The polymerization temperature was then gradually raised to 350° C. over a period of 200 minutes at which time a total of 660 mls of acetic acid had distilled over. After 290 minutes of elapsed reaction time, the temperature of the flask had increased to 314° C., 660 mls of acetic acid had been collected and the torque was 32.8 mV. After 345 minutes of elapsed reaction time, the temperature of the flask was 355.9° C., an additional 68 mls of acetic acid had distilled over, and a reduced pressure was applied to the flask. After 355 minutes of elapsed reaction time, the temperature of the flask was 353.4° C., the torque was 38.8 mV and the reduced pressure was 500 mbars. During this period the viscosity of the polyester continued to increase while the remaining acetic acid was removed from the mixture. When the torque reached 89.0 mV, after an elapsed time of 382 minutes and a temperature of 355.6° C., the reaction was stopped. After cooling (i.e., to about 25° C.), the polymer plug was compounded with 30 weight percent of glass fibers and molded into test bars at a temperature of 350° C. The resulting properties are presented in Table I, below.

The inherent viscosity (IV) of the polymer was determined in a solution of 0.1 percent by weight concentration of 1 to 1, volume to volume, ratio of hexafluoroisopropanol-pentafluorophenol (1:1 v/v of HFIP-PFP) at 25° C. according to the following equation:

$$\eta inh = \ln(\eta\ rel)/c$$

where c=concentration of solution (0.1 percent by weight), and $\eta = rel$ = relative viscosity. The relative viscosity was measured by dividing the flow time in a capillary viscometer of the polymer solution by the flow time for the pure solvent. The polymer was subjected to differential scanning calorimetry (DSC) at a 20° C./min heating rate to determine melt point temperature ($T_m$), and crystallization temperature ($T_c$). The distortion temperature under a load (DTUL), i.e., heat deflection temperature (HDT), was measured in accordance with ASTM No. D648. The melt viscosity (MV) was determined with a Kayeness capillary rheometer having a capillary die measuring 0.03 inches in diameter and 1 inches in length at 365° C., and a shear rate of $10^3$ sec$^{-1}$. The tensile strength, elongation, and tensile modulus were measured in accordance with ASTM No. D638. The flex modulus and flex strength were measured in accordance with ASTM No. D790, and notched Izod was measured in accordance with ASTM No. D256.

Comparative Example 2

As a comparative example, a wholly aromatic anisotropic polyester composition identical to that of Example 1 was prepared, except no nucleating agent was present, containing recurring monomers of 60 mole percent of 4 hydroxybenzoic acid, 3.5 mole percent of 6-hydroxy-2-naphthoic acid, 18.25 mole percent of terephthalic acid, and 18.25 mole percent of 4,4'-dioxybiphenyl. The composition was compounded with 30 weight percent of glass fibers and molded into test bars at a temperature of 350° C. The resulting thermal properties are presented for comparison in Table I, below.

Comparative Example 3

In another comparative example, a composition according to Example 1 was prepared except the nucleating agent was 0.1 mole percent of zinc acetate Zn(OAc)$_2$ (zinc acetate also served as a catalyst). The composition was compounded with 30 weight percent of fiber glass and molded into test bars at a temperature of 350° C. for analyses, the results are present for comparison in Table I, below.

TABLE I

|  | Ex 1 | Comp Ex 2 | Comp Ex 3 |
| --- | --- | --- | --- |
| Nucleating Agent | ZnTA | none | Zn(OAc)$_2$ |
| Melt Temp., °C. | 371 | 365 | 370 |
| MV, poise @ 365° C., $10^3$ sec$^{-1}$ | 450 | 355 | 291 |
| IV, dl/g | 8.3 | 7.53 | 8.33 |
| DTUL @ 264 psi | 282 | 274 | 271 |
| Ten. Str., Kpsi | 18.4 | 22.6 | 12.0 |
| Ten. Mod., Mpsi | 2.1 | 2.4 | 1.9 |
| Elongation, % | 1.5 | 1.9 | 0.9 |
| Flex. Str., Kpsi | 25.5 | 26.6 | 22.5 |
| Flex. Mod., Kpsi | 2.0 | 1.9 | 1.8 |
| Notched Izod, ft. lb/in. | 1.7 | 1.8 | 2.1 |

Table I illustrates that an improvement in DTUL can be experienced by the addition of a small amount of zinc terephthalic to the reaction mixture of a polyester without significant reduction in the melt processability. Comparatively, the addition of zinc acetate reduces the DTUL and mechanical properties of the composition.

Example 4

The procedure of Example 1 was substantially repeated to prepare a composition containing 5 mole percent of 6- hydroxy-2-naphthoic acid; 60 mole percent of 4-hydroxybenzoic acid; 17.5 mole percent of terephthalic acid; 17.5 mole percent of 4,4'-diacetoxybiphenyl; and 0.1 weight percent of zinc terephthalate. The composition was compounded with 30 weight percent of glass fibers and molded into test bars at a temperature of 340° C. The resulting mechanical properties of the bars are presented in Table II, below.

Comparative Example 5

The procedure of Example 1 was substantially repeated to prepare a composition containing 5 mole percent of 6-hydroxy-2-naphthoic acid; 60 mole percent of 4-hydroxybenzoic acid; 17.5 mole percent of terephthalic acid; and 17.5 mole percent of 4,4'-diacetoxybiphenyl (no zinc terephthalate was added to the reaction mixture). The composition was compounded with 30 weight percent of glass fibers and molded into test bars at a temperature of 340° C. The resulting mechanical properties of the bars are presented for comparison in Table II, below.

TABLE II

|  | Example 4 | Comp. Ex. 5 |
| --- | --- | --- |
| Nucleating Agent | ZnTA | None |
| Ten. Strength, Kpsi | 20.9 | 20.5 |
| Ten. Elongation, % | 1.7 | 2.1 |
| Ten. Modulus, Mpsi | 2.2 | 1.9 |
| Flex Strength, Kpsi | 27.8 | 26.5 |
| Flex Modulus, Mpsi | 1.9 | 1.7 |

Example 6

The procedure of Example 1 was substantially repeated to prepare a composition containing 80 mole percent of 4-hydroxybenzoic acid; 20 mole percent of 6-hydroxy-2-naphthoic acid; and 0.1 weight percent of zinc terephthalate. The composition was compounded with 30 weight percent of glass fibers and molded into test bars at a temperature of 320° C. The resulting mechanical properties of the bars are presented in Table III, below.

Comparative Example 7

The procedure of Example 1 was substantially repeated to prepare a composition containing 80 mole percent of 4-hydroxybenzoic acid, and 20 mole percent of 6-hydroxy-2-naphthoic acid (no zinc terephthalate was added to the reaction mixture). The composition was compounded with 30 weight percent of glass fibers and molded into test bars at a temperature of 320° C. The resulting mechanical properties of the bars are presented for comparison in Table III, below.

TABLE III

|  | Example 6 | Comp. Ex. 7 |
| --- | --- | --- |
| Nucleating Agent | ZnTA | None |
| Ten. Strength, Kpsi | 24.1 | 23.0 |
| Ten. Elongation, % | 1.8 | 1.7 |

TABLE III-continued

|  | Example 6 | Comp. Ex. 7 |
|---|---|---|
| Ten. Modulus, Mpsi | 2.3 | 2.1 |
| Flex Strength, Kpsi | 32.7 | 31.0 |
| Flex Modulus, Mpsi | 2.1 | 1.9 |

Example 8

The procedure of Example 1 was substantially repeated to prepare a composition containing 73 mole percent of 4-hydroxybenzoic acid; 27 mole percent of 6-hydroxy-2-naphthoic acid; and 0.1 weight percent of zinc terephthalate. The composition was compounded with 30 weight percent glass and molded into test bars at a temperature of 285° C. The mechanical properties of the bars are presented in Table IV, below.

Comparative Example 9

The procedure of Example 1 was substantially repeated to prepare a composition containing 73 mole percent of 4-hydroxybenzoic acid, and 27 mole percent of 6-hydroxy-2-naphthoic acid (no zinc terephthalate was added). The composition was compounded with 30 weight percent glass and molded into test bars at a temperature of 285° C. The mechanical properties of the bars are presented for comparison in Table IV, below.

TABLE IV

|  | Example 8 | Comp. Ex. 9 |
|---|---|---|
| Nucleating Agent | ZnTA | None |
| Ten. Strength, Kpsi | 28.7 | 30.0 |
| Ten. Elongation, % | 1.6 | 2.2 |
| Ten. Modulus, Mpsi | 3.0 | 2.4 |
| Flex Strength, Kpsi | 36.7 | 37.0 |
| Flex Modulus, Mpsi | 2.5 | 2.1 |

The data as presented in Tables II through IV illustrate that no significant reduction in mechanical and thermal properties results from the addition of a small amount of zinc terephthalate to polyesters.

Example 9

The general procedure of Example 1 was utilized to prepare liquid crystalline polyester compositions containing from 0.05 to 0.5 weight percent ZnTA, based on the total weight of the polyester. The compositions were compounded with 30 weight percent glass fibers, and molded into test bars at a temperature of 350° C. The mechanical properties of the resulting compositions are presented for comparison in Table V, below.

TABLE V

| ZnTA, mole % | 0.05 | 0.15 | 0.20 | 0.25 | 0.50 |
|---|---|---|---|---|---|
| Ten. Str., Kpsi | 19.4 | 19.9 | 20.4 | 16.2 | 19.9 |
| Ten. Elg., % | 1.7 | 1.8 | 1.9 | 1.3 | 1.8 |
| Ten. Mod., Mpsi | 2.1 | 2.0 | 2.0 | 2.0 | 2.0 |
| Flex Str., Kpsi | 26.7 | 25.3 | 27.1 | 25.8 | 26.2 |
| Flex Mod., Mpsi | 1.9 | 1.8 | 1.9 | 1.7 | 1.9 |
| N. Izod, ft-lb/in. | 2.0 | 1.9 | 2.1 | 2.1 | 2.0 |
| DTUL @ 264 psi, °C. | 277 | 276 | 277 | 270 | 275 |

Table V illustrates the improvement in DTUL as well as mechanical properties which may be experienced by the addition of from 0.05 to 0.5 weight percent of a ZnTA nucleating agent, based on the total weight of the polyester composition.

Example 10

The general procedure of Example 1 was utilized to prepare liquid crystalline polyester compositions containing from 0 to 0.5 weight percent ZnTA, based on the total weight of the composition. The compositions were spun into fibers at a temperature of about 375° C., utilizing various polymer filtering pressures (psi) and maximum fiber take-up speeds (M. TUS, rpm) by conventional techniques. The fibers were heat treated at a temperature of 300° C. for 8 minutes. As-spun and heat treated fiber properties are presented in Table VI, below.

Comparative Example 11

As a comparative example, the procedure of Example 1 was utilized to prepare an identical polyester compositions except 0.1 weight percent of zinc acetate, based on the total weight of the composition, was added to the reaction mixture. The polyester was spun into fiber utilizing the procedure of Example 10. As spun and heat treated fiber properties are presented for comparison in Table VI, below.

TABLE VI

| Comp. wt. % | As-Spun Prop. | | | | | Heat Treated Prop. | | |
|---|---|---|---|---|---|---|---|---|
|  | Spin Press, psi | M.TUS | Ten, g/d | Elong, % | Mod. g/d | Ten, g/d | Elong, % | Mod, g/d |
| 0 ZnTA | 465 | 1800 | 9.2 | 1.8 | 563 | 22.3 | 2.2 | 932 |
| .5 ZnTA | 650 | 1150 | 8.9 | 1.6 | 575 | 18.8 | 1.8 | 977 |
| .1 ZnTA | 650 | 1500 | 9.9 | 1.7 | 621 | 15.4 | 1.5 | 992 |
| .15 ZnTA | 350 | 1700 | 7.8 | 1.4 | 571 | 16.5 | 1.8 | 887 |
| .2 ZnTA | 400 | 1250 | 8.1 | 1.5 | 558 | 16.5 | 1.8 | 896 |
| .25 ZnTA | 650 | 800 | 7.8 | 1.4 | 545 | 13.5 | 1.4 | 895 |
| .5 ZnTA | 900 | 1200 | 7.5 | 1.4 | 556 | 15.9 | 1.6 | 944 |
| .1 ZnOAc | 490 | 800 | 7.9 | 1.5 | 534 | 15.5 | 1.6 | 925 |

We claim:

1. An improved melt processable liquid crystalline polyester composition capable of forming an anisotropic melt phase at a temperature below about 400° C., the improvement consisting essentially of the in situ formation of the composition in the presence of from approximately 0.05 to approximately 1.0 weight percent of at least one nucleating agent of the formula:

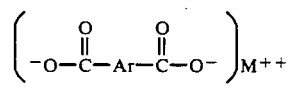

wherein M is selected from the group consisting of zinc, calcium, cadmium, barium and mixtures thereof, wherein Ar is selected from the group consisting of

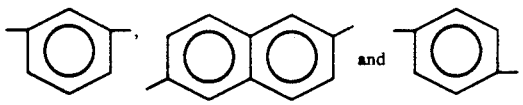

wherein upon melt processing, the nucleating agent is absorbed into the matrix of the composition to enhance the crystallization and distortion temperature under a load of the composition.

2. The composition according to claim 1 wherein the polyester is selected from the group consisting of wholly aromatic polyesters, aliphatic-aromatic polyesters, poly(ester-carbonates) and poly(esteramides).

3. The composition according to claim 2 wherein the nucleating agent is of the formula:

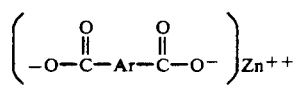

4. The composition according to claim 3 wherein the amount of the nucleating agent is approximately 0.5 weight percent.

5. The composition according to claim 1 capable of forming an anisotropic melt phase at a temperature of below approximately 350° C. and consisting essentially of recurring moieties of (a) from approximately 10 to approximately 90 mole percent of 4-oxybenzoyl and (b) from approximately 10 to approximately 90 mole percent of 6-oxy-2-naphthoyl; and from approximately 0.05 to approximately 1.0 weight percent of a nucleating agent of the formula:

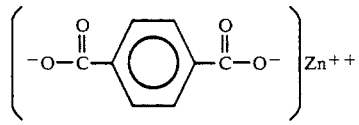

6. The composition according to claim 5 wherein the polyester consisting of (a) from approximately 73 to approximately 80 mole percent of 4-oxybenzoyl, and (b) from approximately 20 to approximately 27 mole percent of 6-oxy-2-naphthoyl.

7. The composition according to claim 1 wherein the polyester is capable of forming an anisotropic melt phase at a temperature below approximately 375° C. and consisting essentially of recurring moieties of (a) from approximately 20 to approximately 70 mole percent of 4-oxybenzoyl; (b) from approximately 3 to approximately 10 mole percent of 6-oxy-2-naphthoyl; (c) from approximately 7.5 to approximately 38.5 mole percent of terephthaloyl; and (d) from approximately 7.5 to approximately 38.5 mole percent of 4,4'-dioxybiphenyl.

8. The composition according to claim 7 wherein the nucleating agent is of the formula:

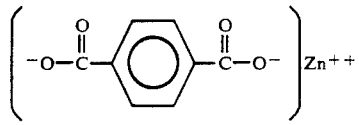

9. The composition according to claim 8 wherein the amount of nucleating agent is approximately 0.05 weight percent.

10. The composition according to claim 9 exhibiting a heat distortion temperature under a load of 264 psi of at least about 274° C.

11. A film, fiber or molded article produced from the composition according to claim 10.

12. The molded article according to claim 11 having a tensile modulus of at least about 2.0 Mpsi.

13. A method of improving the distortion temperature under a load of a melt processable wholly aromatic liquid crystalline polyester composition capable of forming an anisotropic melt phase at a temperature below approximately 375° C., consisting essentially of recurring moieties of (a) from approximately 20 to approximately 70 mole percent of 4-oxybenzoyl, (b) from approximately 3 to approximately 10 mole percent of 6-oxy-2-naphthoyl, (c) from approximately 7.5 to approximately 38.5 mole percent of terephthaloyl, and (d) from approximately 7.5 to approximately 38.5 mole percent of a 4,4'-dioxybiphenyl, comprising the steps forming the composition in the presence of from approximately 0.05 to approximately 1.0 mole percent of at least one nucleating agent of the formula:

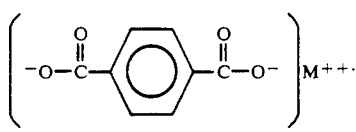

wherein M is selected from the group consisting of zinc, calcium, cadmium, barium and mixtures thereof, wherein Ar is selected from the group consisting of

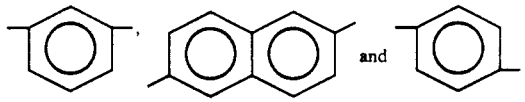

and wherein upon melt processing the nucleating agent is absorbed into the matrix of the composition to enhance the crystallization.

14. The method according to claim 13 wherein M is zinc.

15. The method according to claim 14 wherein the amount of the nucleating agent is approximately 0.5 weight percent.

16. The method according to claim 15 wherein the composition exhibits a heat distortion temperature under a load of 264 psi of at least about 274° C.

17. The method according to claim 13 wherein the composition is capable of forming an anisotropic melt phase at a temperature of below approximately 350° C., said composition consisting essentially of recurring moieties of (a) approximately 60 mole percent of 4-oxybenzoyl, (b) approximately 3.5 mole percent of 6-oxy-2-naphthoyl, (c) approximately 18.25 mole percent of terephthaloyl, and (d) approximately 18.25 mole percent of a 4,4'-dioxybiphenyl; and from approximately 0.05 to approximately 0.5 mole percent of at least one nucleating agent of the formula:

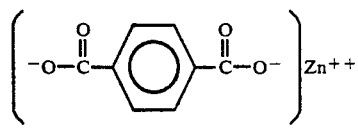

18. The method according to claim 17 wherein the composition exhibits a heat distortion temperature under a load of 264 psi of at least about 274° C.

19. The product produced by the method of claim 13.

20. A film, fiber, or molded article produced from the product according to claim 18.

21. A method of improving the heat distortion under a load of a liquid crystalline polyester composition, the improvement consisting essentially of forming the polyester in situ in the presence of from approximately 0.05 to approximately 1.0 weight percent of a nucleating agent of the formula:

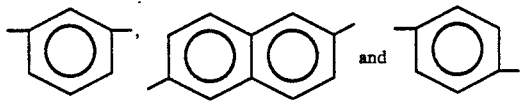

wherein M is selected from the group consisting of zinc, calcium, cadmium, barium and mixtures thereof, and wherein Ar is selected from the group consisting of

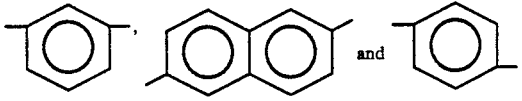

* * * * *